(12) United States Patent
Bent et al.

(10) Patent No.: US 11,334,434 B2
(45) Date of Patent: May 17, 2022

(54) MULTI-LEVEL ERASURE SYSTEM WITH COOPERATIVE OPTIMIZATION

(71) Applicant: Seagate Technology LLC, Cupertino, CA (US)

(72) Inventors: John Michael Bent, Los Alamos, NM (US); Kenneth K. Claffey, Danville, CA (US); Ian Davies, Longmont, CO (US); Bikrant Kumar Singh, Dublin, CA (US)

(73) Assignee: SEAGATE TECHNOLOGY LLC

(*) Notice: Subject to any disclaimer, the term of this patent is extended or adjusted under 35 U.S.C. 154(b) by 154 days.

(21) Appl. No.: 16/794,951

(22) Filed: Feb. 19, 2020

(65) Prior Publication Data

US 2021/0255925 A1 Aug. 19, 2021

(51) Int. Cl.
*G06F 11/10* (2006.01)
*G06F 11/14* (2006.01)
*G06F 11/20* (2006.01)
*G06F 11/07* (2006.01)
*G06F 3/06* (2006.01)

(52) U.S. Cl.
CPC .......... *G06F 11/1092* (2013.01); *G06F 3/067* (2013.01); *G06F 3/0619* (2013.01); *G06F 3/0653* (2013.01); *G06F 3/0689* (2013.01); *G06F 11/0772* (2013.01); *G06F 11/1471* (2013.01); *G06F 11/2087* (2013.01); *G06F 2211/1028* (2013.01)

(58) Field of Classification Search
CPC ............. G06F 11/1092; G06F 11/0772; G06F 11/1471; G06F 11/2087; G06F 3/0619; G06F 3/0653; G06F 3/067; G06F 3/0689; G06F 2211/1028
See application file for complete search history.

(56) References Cited

U.S. PATENT DOCUMENTS

| | | |
|---|---|---|
| 5,278,838 A | 1/1994 | Ng et al. |
| 6,070,249 A | 5/2000 | Lee |
| 7,734,591 B1 * | 6/2010 | Mercier ............... G06F 11/1466 707/639 |
| 8,839,028 B1 | 9/2014 | Polia et al. |
| 9,658,784 B1 * | 5/2017 | Ahmad ............... G11B 5/00813 |
| 10,025,583 B2 * | 7/2018 | Butler .................... G06F 8/654 |
| 10,218,789 B2 | 2/2019 | Yang et al. |
| 10,437,674 B1 * | 10/2019 | Sridhara ............. G06F 11/1076 |
| 2003/0135793 A1 | 7/2003 | Craig et al. |

(Continued)

*Primary Examiner* — Matthew M Kim
*Assistant Examiner* — Matthew N Putaraksa
(74) *Attorney, Agent, or Firm* — Hall Estill Law Firm

(57) ABSTRACT

A data storage erasure system may have a host connected to a plurality of data storage devices via a network controller with each of the plurality of data storage devices and the network controller connected to a pods controller and each of the plurality of the data storage devices having a device controller. A rebuild strategy can be generated with a rebuild module connected to the plurality of data storage devices, the network controller, and the pods controller. The rebuild strategy may be directed to minimize data rebuild times in the event of a failure in the plurality of data storage devices by executing the rebuild strategy in response to a detected or predicted failure in at least one data storage device of the plurality of data storage devices.

20 Claims, 5 Drawing Sheets

(56) References Cited

U.S. PATENT DOCUMENTS

| | | | |
|---|---|---|---|
| 2005/0015641 A1* | 1/2005 | Alur | G06F 11/1458 |
| | | | 714/2 |
| 2006/0024030 A1* | 2/2006 | Hwang | G11B 27/3027 |
| | | | 386/240 |
| 2006/0074954 A1 | 4/2006 | Hartine et al. | |
| 2006/0080362 A1* | 4/2006 | Wagner | G06F 3/0611 |
| 2006/0242540 A1* | 10/2006 | Cherian | G06F 11/1076 |
| | | | 714/766 |
| 2007/0300013 A1* | 12/2007 | Kitamura | G06F 11/1471 |
| | | | 711/114 |
| 2008/0115017 A1 | 5/2008 | Jacobson | |
| 2009/0150712 A1* | 6/2009 | Balasubramanian | G06F 11/20 |
| | | | 714/1 |
| 2010/0235677 A1* | 9/2010 | Wylie | G06F 11/1076 |
| | | | 714/5.1 |
| 2013/0055049 A1 | 2/2013 | Murakami | |
| 2014/0047264 A1* | 2/2014 | Wang | H04L 41/0668 |
| | | | 714/4.11 |
| 2014/0215147 A1* | 7/2014 | Pan | G06F 11/1092 |
| | | | 711/114 |
| 2016/0292035 A1* | 10/2016 | Alcorn | G06F 11/0757 |
| 2019/0050289 A1 | 2/2019 | Kachare et al. | |
| 2019/0361606 A1* | 11/2019 | Goker | H03M 13/2918 |
| 2020/0004701 A1* | 1/2020 | Subbarao | G06F 3/0656 |
| 2020/0019323 A1* | 1/2020 | Zagade | G06F 3/061 |
| 2020/0042388 A1* | 2/2020 | Roberts | G06F 11/1088 |
| 2021/0294497 A1* | 9/2021 | Deguchi | G06F 3/065 |

\* cited by examiner

MULTI-LEVEL ERASURE SYSTEM WITH COOPERATIVE OPTIMIZATION

SUMMARY

A data storage system, in accordance with some embodiments, has a host connected to a plurality of data storage devices via a network controller with each of the plurality of data storage devices and the network controller connected to a pods controller and each of the plurality of the data storage devices having a device controller. A rebuild strategy generates a rebuild module connected to the plurality of data storage devices, the network controller, and the pods controller. The rebuild strategy is directed to minimize data rebuild times in the event of a failure in the plurality of data storage devices by executing the rebuild strategy in response to a detected failure in at least one data storage device of the plurality of data storage devices. The rebuild strategy is subsequently altered by the rebuild module in response to a detected failure in the plurality of data storage devices.

Other embodiments of a data storage system connect a host to a plurality of data storage devices via a network controller with each of the plurality of data storage devices and the network controller connected to a pods controller and each of the plurality of the data storage devices having a device controller. A rebuild strategy generates a rebuild module connected to the plurality of data storage devices, the network controller, and the pods controller. The rebuild strategy is directed to minimize data rebuild times in the event of a failure in the plurality of data storage devices by executing the rebuild strategy in response to a detected failure in at least one data storage device of the plurality of data storage devices. The rebuild strategy is subsequently altered by the rebuild module in response to a failure in the plurality of data storage devices predicted by the rebuild module.

A system has, in various embodiments, a host connected to a plurality of data storage devices via a network controller with each of the plurality of data storage devices and the network controller connected to a pods controller and each of the plurality of the data storage devices having a device controller. A rebuild strategy is generated with a rebuild module connected to the plurality of data storage devices, the network controller, and the pods controller. The rebuild strategy is directed to minimize data rebuild times in the event of a failure in the plurality of data storage devices. Execution of the rebuild strategy involves the device controller and at least one of the pods controller and network controller in response to a detected failure in at least one data storage device of the plurality of data storage devices.

These and other features which may characterize assorted embodiments can be understood in view of the following detailed discussion and the accompanying drawings.

DETAILED DESCRIPTION

The various embodiments discussed herein, without limitation, are generally directed to a distributed data storage system employing multi-level erasure intelligently to provide optimized data durability with reduced cost.

The expansion of cloud data storage has allowed computing systems to become leaner and more efficient as data storage hardware is positioned off-site. The ability to store and access data from off-site locations allows computing systems to employ less on-site temporary and permanent data storage capabilities, which reduces the physical size and power consumption associated with operation. However, the evolution of large-scale distributed data storage, which can be characterized as a cloud data storage, has experienced a variety of challenges associated with providing secure, reliable, and fast data accesses.

A distributed data storage system can store portions of data in multiple different data storage devices to provide increased data reliability, but the failure of a data storage device can cause performance degradation as data is rebuilt within the system. The distribution of data across multiple data storage devices may further provide reduced data access latency by employing multiple data channels, but can be plagued by the generation and maintenance of data overhead associated with distributed data storage. Such issues can be exacerbated by the fact that many data storage devices have a limited lifespan corresponding with a finite number of data writes, such as devices employing Flash memory.

Accordingly, various embodiments optimize data storage by proactively and/or reactively configuring distributed data to provide fast and efficient data rebuild operations in the event of a failure. The intelligent proactive configuration of data can reduce the volume and time associated with data rebuilding after a data storage device error and/or failure. The communication between multiple levels of a distributed data storage system can intelligently react to errors and/or failures to provide quicker and more efficient rebuilding operations with increased data durability.

Figure 1:
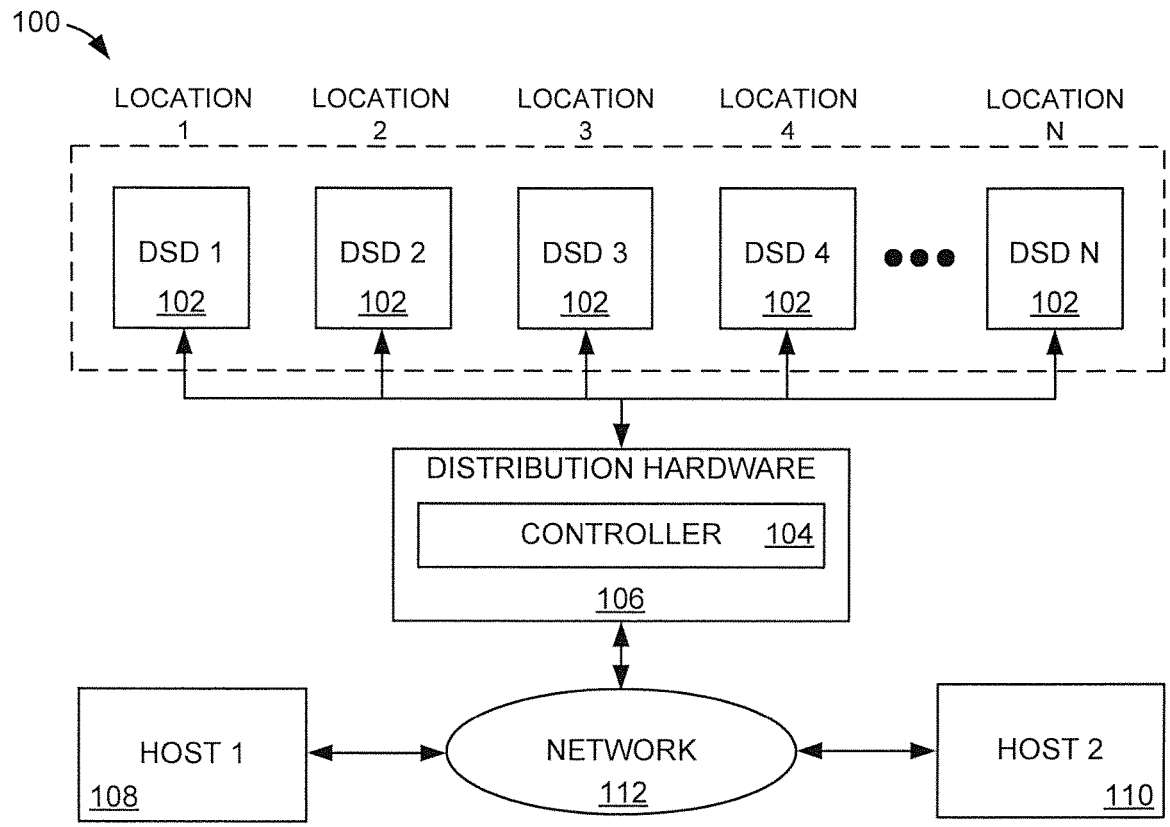
FIG. 1 provides a functional block representation of an example distributed data storage system in which various embodiments can be practiced.

FIG. 1 is a block representation of an example data storage system 100 in which various embodiments can be practiced. The system 100 may be any size and consist of any size number and type of interconnected computing components. In the non-limiting configuration of FIG. 1, a plurality of data storage devices 102 (DSD1-N) are each connected to at least one shared controller 104 resident in distribution hardware 106. The shared controller 104 can direct data storage operations to, and from, the various data storage devices 102 to, and from, any number of remote hosts.

Although not required or limiting, the system 100 can connect first 108 and second 110 remote hosts to the distribution hardware 106. The remote hosts 108/110 can be physically separate while being connected to the shared controller 104 via a wired and/or wireless network 112. The shared controller 104 can treat some, or all, of the data storage devices 102 as a redundant array of independent disks/devices (RAID), as shown by segmented lines, with configurations, such as level 0, 4, 5, 6, etc., where data is striped and/or mirrored with or without parity data to provide reliable data storage.

The shared controller 104 can direct the flow of data to, and from, individual data storage devices 102 as well to a group of more than one data storage devices 102 to fulfill pending data access requests, such as data reads and data writes from the hosts 108/110. It is contemplated that the shared controller 104 can also direct data traffic in and among the data storage devices 102 as part of data storage maintenance or security. It is contemplated, but not required, that the various data storage devices 102 are physically present at different locations, such as different cities, states, countries, continents, or hemispheres, to increase system integrity in view of a unit failure corresponding with geographic location. Different physical locations can also be employed for the distribution hardware 106 and remote hosts 108/110. Hence, each aspect of the data storage system 100 can be located at different, and unique, physical locations while being interconnected by the network 112.

Figure 2:
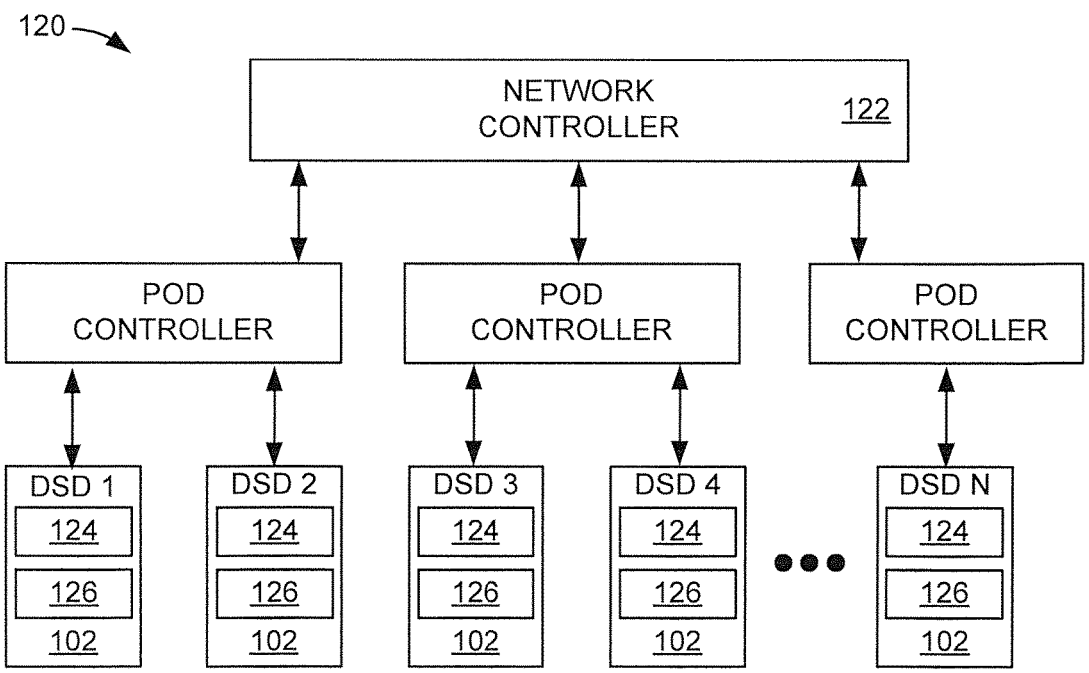
FIG. 2 is a block representation of a portion of an example data storage system arranged in accordance with some embodiments.

FIG. 2 depicts a block representation of portions of an example data storage system 120 arranged in accordance with some embodiments. The system 120 can have one or more network controllers 122 that operate to carry out data access requests from one or more hosts 108/110. A network controller 122 may supplement, or replace, a shared controller 104 positioned in distribution hardware 106. As a non-limiting example, a network controller 122 may be part of a server, router, switch, or node that interacts on a front-end with assorted hosts 108/110 while a shared controller 104 is a part of an enclosure or rack that houses numerous separate data storage devices 102. Another example can configure the network controller 122 and shared controller 122 as similar types of network equipment, such as a server, router, or node, with different operational tasks associated with writing data to, and retrieving data from, one or more connected data storage device 102.

While the various data storage devices 102 that are incorporated into the distributed data storage system 120 may have different capabilities and configurations, such as capacity, error rate, and data access latency, it is contemplated that each data storage device 102 has a local controller 124 that conducts at least data access and maintenance operations on local memory 126. As such, the data storage devices 102 may employ rotating magnetic media, solid-state arrays, or a combination thereof to provide memory 126 available to store data from one or more hosts 108/110. The physically separate positioning of the data storage devices 102 in the data storage system 120 allows for user data from the assorted system hosts 108/110 to be distributed across multiple different devices 102 to protect from data storage errors and/or failures that are localized to a particular physical location, such as a power outage or natural disaster.

Figure 3:
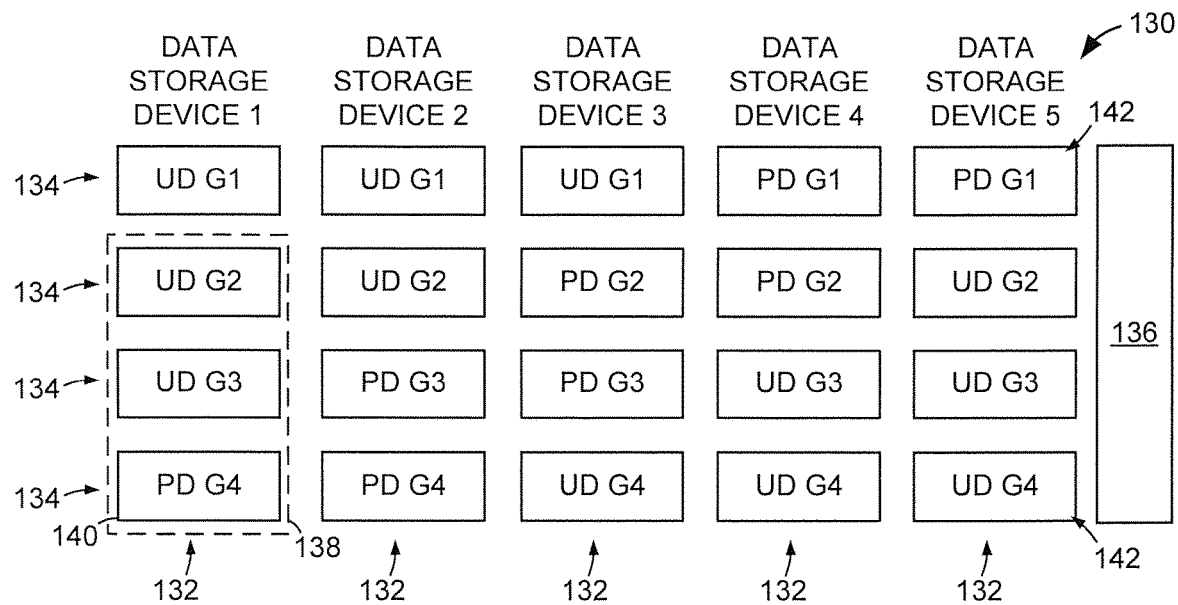
FIG. 3 depicts a block representation of portions of an example data storage system configured in accordance with at least one embodiment.

FIG. 3 generally conveys a block representation of portions of an example data storage system 130 configured in accordance with assorted embodiments. The system 130 arranges numerous data storage devices 102 logically into columns 132 and rows 134 with each column 132 consisting of different data storage addresses in one or more data storage devices 102 positioned at a single location while each row consists of different data storage addresses in different data storage devices 102 positioned at different physical locations.

That is, a column 132 is configured with data destinations in one, or many, data storage devices 102 physically positioned in a common location. For instance, a column 132 can be different physical block addresses (PBA) in a single data storage device 102 or in multiple data storage devices 102 positioned in different data enclosures at a single physical location. Hence, each data storage device 102 of each column 132 shown in FIG. 3 is located at a common physical location while each row 134 has different data storage devices 102 distributed across different data storage locations in different physical locations.

The logical configuration of the logical block addresses (LBA) provided by the assorted data storage devices 102 into columns 132 and rows 134 can be organized and executed with one or more controllers 136 that may be located locally, such as controller 124, in the distribution hardware 106, such as controller 104, or in the network, such as controller 122. The respective controllers 136 of the data storage system 130 can operate independently, collectively, and sequentially with the local programmable hardware of the various data storage devices 102 that comprise the system 130 to carry out data access requests of connected hosts 108/110 as well as data maintenance operations, such as garbage collection, deduplication, and encryption.

Segmented line box 138 conveys how less than all of the LBAs of a column 132 can be part of a common data storage device 102. However, it is noted that all the LBAs of a column 132 may alternatively be part of a multiple data storage devices 102. The ability to aggregate LBAs from one or more data storage devices 102 into a common logical column 132 allows the controller 136 freedom to form LBA 140 configurations to optimize performance regardless of the number, type, and capacity of available data storage devices 102.

It is noted that no matter the number and physical location of the data storage devices that provide the LBAs, the data capacity and data transfer speed of the respective data storage devices 102 can be similar or dissimilar. Thus, the controller 136 can organize and conduct data storage operations, such as data writes, data reads, data updates, and data moves, to LBAs in data storage devices 102 that have different data storage characteristics, such as write latency, read latency, and capacity.

The controller 136 can configure the data storage system 130 as a single RAID group where user-generated data (UD) is mirrored and/or striped with, or without, static or rotational parity data (PD1 & PD2) according to provisioned RAID levels, such as 0, 4, 5, or 6. As shown in FIG. 3, the controller 136 can configure the data storage system 130 with each row 134 being a provisioned RAID group (G1/G2/G3/G4) where a data is distributed according to a selected RAID level.

Despite rotational parity provided by RAID levels 5 and 6, as opposed to static parity provided by RAID level 4, the data storage system 130 can be susceptible to data loss and performance-degrading data reconstruction operations as a result of encountered errors and/or failures concurrently in more than one data storage devices 102. It is noted that the utilization of multiple parity values for a block of user-generated data may provide system 130 resiliency for two concurrent data storage device 102 failures, but can correspond with relatively long and complex data rebuild operations. It is further noted that the use of uniform data stripes 142 consisting of the same numbers of user data portions and parity data portions, which can be designated as 3+2 with each stripe 142 having 3 distributed user data portions and 2 distributed parity portions, allows for patterned distribution of parity data so that not all parity is stored in a consolidated number of devices 102 and/or LBAs.

While maintaining uniform data stripe 142 configurations can provide efficient data storage in a distributed model, such uniform configuration can rarely be maintained over time as LBAs of data storage devices 102 become error-prone and/or incapable of reliably storing data. For instance, failure of a block of LBAs in a solid-state data storage device 102 due to a high number of data writes would cause a uniform data stripe 142 configuration to either be completely reconstructed to valid LBAs or blocks of LBAs to be ignored for data storage, which decreases the practical capacity and efficiency of the system 130 over time. With these issues in mind, embodiments of a distributed data storage system are directed to utilizing irregular data stripe configurations.

Figure 4:
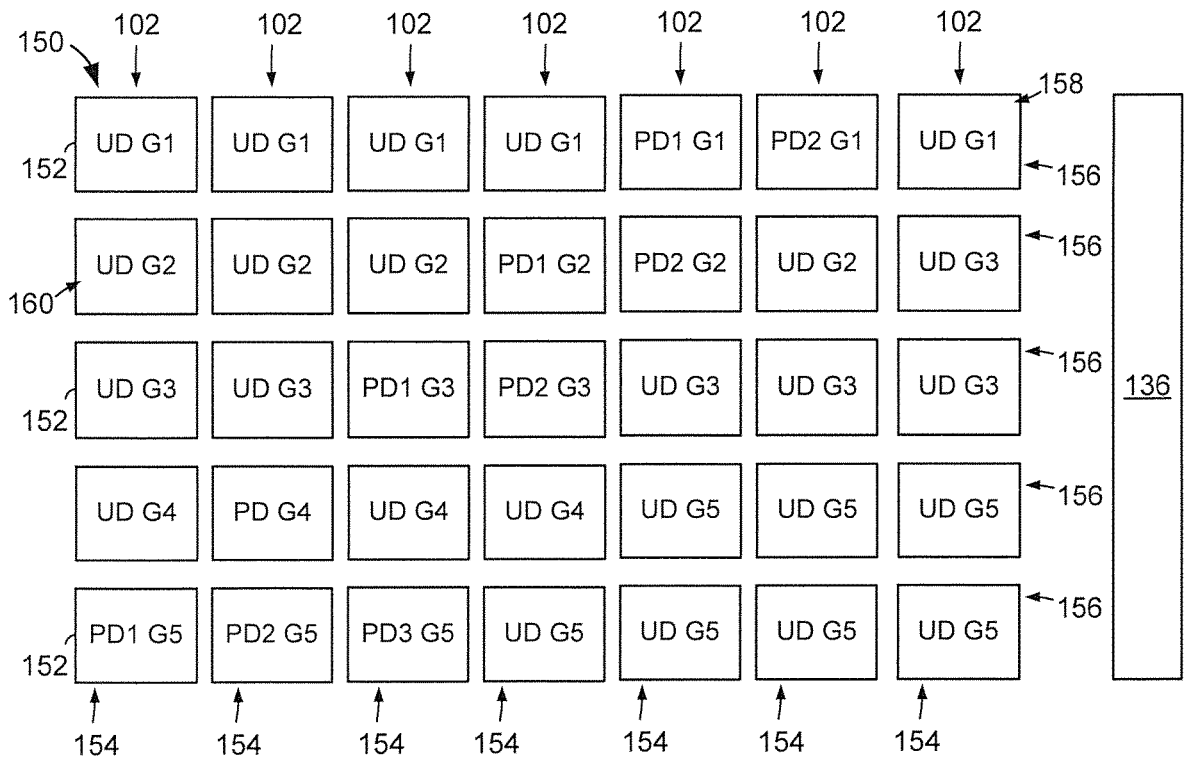
FIG. 4 shows a block representation of portions of an example data storage system employed in accordance with various embodiments.

FIG. 4 shows a block representation of portions of an example data storage system 150 configured and employed in accordance with various embodiments. A plurality of data storage devices 102 are utilized in different physical locations to provide LBAs 152 logically arranged into columns 154 and rows 156, as shown. In contrast to the uniform data stripes 140 of FIG. 3, the system 150 concurrently stores data stripes having different configurations. In a non-limiting example, data stripe 158 (G1) has a 5+2 configuration stored in a single row 156 of LBAs while data stripe 160 (G2) has a 4+2 configuration stored in multiple different rows 156.

The ability to vary the number of user data partitions and the number of parity data blocks for a data stripe provides flexibility and freedom to alter data storage conditions over time to provide consistent performance and reliability. However, the use of irregular data stripe configurations can result in system 150 performance degradation due to greater amounts of processing needed to utilize the assorted LBAs 152 compared to the uniform data stripes 140 of FIG. 3. Data storage performance degradation associated with irregular data stripes can be particularly experienced during data rebuild operations when the parity data is employed to reconstruct other portions of the data stripe. That is, the reconstruction of a portion of a column 154 may involve a greater amount of processing and time to rebuild due to irregular data stripes compared to uniform data stripes where a patterned number of parity and user data are to be reconstructed after a failure.

Figure 5:
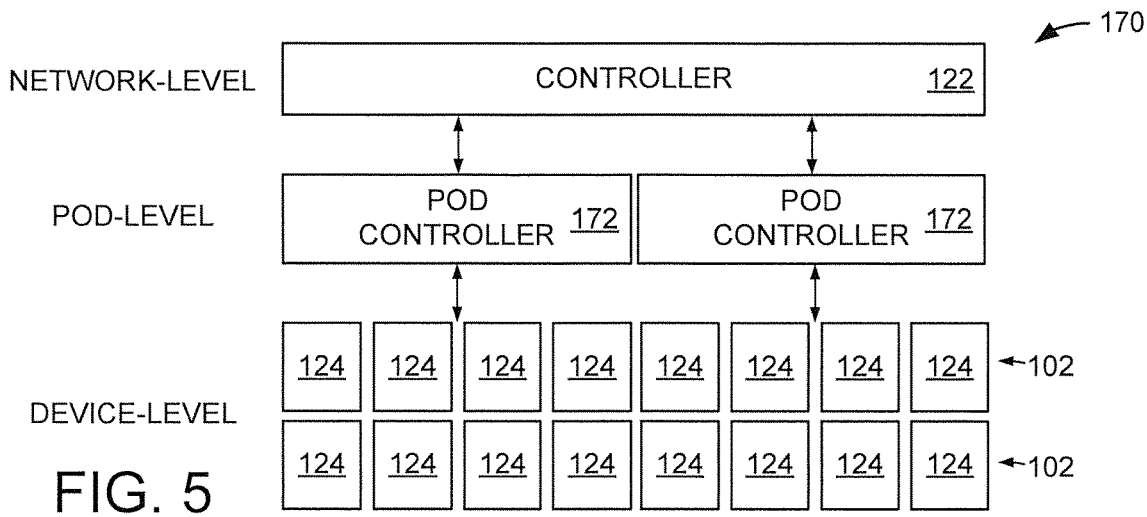
FIG. 5 shows a block representation of portions of an example data storage system arranged and operated in accordance with various embodiments.

The complexity and processing time associated with rebuilding data in a distributed system 150 employing irregular data stripes can be mitigated with multi-level erasure where parity data and/or information is stored in multiple different levels of the distributed data storage system 140. FIG. 5 displays a block representation of an example data storage system 170 employing a multi-level erasure configuration in accordance with various embodiments. The system 170 can employ any number of data storage devices 102 that may be distributed across multiple different physical locations, such as in different time zones, to store at least user data and associated parity data from one or more connected hosts 108/110.

The respective data storage devices 102 can be connected to the respective hosts 108/110 via one or more network components, such as servers, nodes, distributed hardware, routers, and switches, that service data access requests by the assorted hosts 108/110 while providing robust data storage in the form of distributed user data portions and erasure data. It is noted that erasure data can comprise any data and information relating to the rebuilding of user data blocks and/or data structures of a data storage device 102. For instance, erasure data may consist of parity data associated with user-generated data, redundant data mirrored from another LBA of the system 170, metadata associated with user or non-user generated data, or information relating to the history, performance, organization, or structure of a data storage device and/or portion of the data storage system 170.

With the organization of the various data storage components in the system 170, the data storage devices 102 can be considered device-level data storage while a plurality of data storage devices 102, such as a data enclosure, rack, or single physical location, can be considered pods-level data storage and network components can be considered network-level data storage. As a non-limiting example, device-level storage can consist of a single data storage device that stores user-generated data and associated parity data for multiple different data stripes, pods-level storage can consist of a controller 172, which can correspond with a shared controller 104, directing operation of multiple separate data storage devices that respectively store multiple different data stripes, and network-level storage can consist of a controller directing multiple different groups of data storage devices.

The logical organization of data storage devices 102 into hierarchical levels, as shown, allows for efficient erasure operations involving the reconstruction of at least some data in at least one data storage device 102. Such hierarchical levels can correspond with different erasure resolutions that allow parity data and other erasure information to be quickly determined. For instance, the network-level can store erasure data with a first resolution that corresponds with a plurality of different data storage devices in different data racks, the pods-level can store erasure data with a second resolution that corresponds with a plurality of different data storage devices in a single rack, and the device-level can store erasure data corresponding to a single data storage device.

A non-limiting practical example of the use of hierarchical erasure levels stores different resolutions of erasure data and/or information in the respective levels and, in response to a data storage device error and/or failure, sequentially polls the respective network-level, pods-level, and device-level erasure data to reconstruct the data stored in the error/failed data storage device. The configuration of the different erasure data resolutions allows polling of erasure data to be faster, but more abstract, at the network-level and slower, but more thorough, at the device-level. As a result, a device error/failure can be more quickly handled if ample erasure data is found in the network-level or pods-level compared to exhaustively polling each data storage device of the device-level for erasure data when an error/failure occurs.

While greater data reconstruction efficiency can be experienced with the use of different erasure data levels and resolutions compared to erasure data stored in a single resolution, the durability of data and performance of the hierarchical multi-level erasure system 170 can be optimized by increasing the communication and cooperation between the levels. Hence, various embodiments are directed to improving the use of multi-level erasure systems 170 to reduce the time and processing corresponding to the rebuilding/reconstruction of data and/or data structures after a data storage device error or failure.

Figure 6:
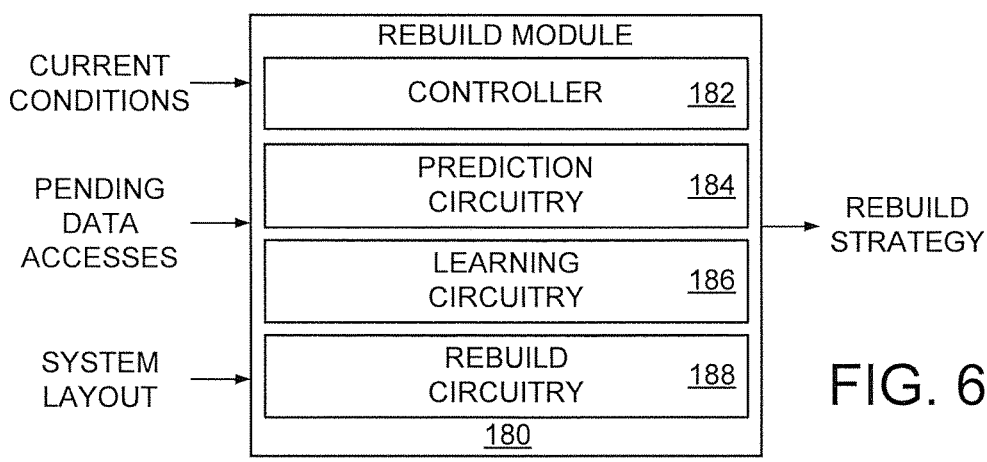
FIG. 6 displays a block representation of an example rebuild module that can be utilized in a data storage system in accordance with assorted embodiments.

FIG. 6 depicts a block representation of an example rebuild module 180 that can be realized in hardware and utilized in a data storage system in accordance with assorted embodiments. The rebuild module 180 can be constructed as one or more circuits and programmable hardware resident in a single data storage device 102, distributed hardware 106, network controller 122, or host 108. It is contemplated that multiple rebuild modules 180 may be part of a data storage system and utilized redundantly, sequentially, or independently with similar, or dissimilar, capabilities and configurations.

A rebuild module 180 can have a local controller 182, such as programmable circuit or processor, that directs input of at least current data storage conditions, current data storage performance, data error rate, and data stripe configurations to generate a rebuild strategy that provides proactive and reactive measures to be taken to reduce the occurrence of data storage device failures and the time associated with repairing data and data structures in response to an encountered data storage device error/failure. The rebuild module 180 may utilize the local controller 182 alone, or with other controllers 104/122/136 of the data storage system 180, to generate, modify, and otherwise maintain the rebuild strategy in a form that best optimizes data rebuilding operations.

The rebuild module 180 may have prediction circuitry 184 that converts input system/data information into at least rebuild times associated with a hypothetical failure at one or more locations in the system. For instance, the prediction circuitry 184 can simulate a data failure in a single data storage device and multiple data storage devices in one or more separate locations to forecast how long such a failure will take to reconstruct the corrupted data. Learning circuitry 186 of the rebuild module 180 may complement the prediction circuitry 184 to improve the accuracy of forecasted data rebuild times. That is, the learning circuitry 186 may log past data rebuild operations to a data storage device, data stripe, data rack, and physical location to learn the predictable aspects of data rebuilding for various aspects of a distributed data storage system. As such, the learning circuitry 186 can be rear-facing in response to past system events while the predication circuitry 184 is forward-facing by predicting future system events.

The ability to learn about past system events and accurately forecast future data events can ensure a rebuild strategy can mitigate the performance degradation of a data storage device error/failure. By incorporating rebuild circuitry 188 into the rebuild module 180, hardware can additionally take current, and historical, data storage system information and conditions to evaluate different proactive and reactive rebuilding scenarios and their effect on rebuilding times as well as stored data vulnerability. The rebuild circuitry 188 can predict a variety of different proactive data movement, stripe configurations, and rebuild processing options alone, or in combination with the prediction circuitry 184, to ensure that the rebuild strategy prescribes the optimal actions to minimize rebuilding of data and/or data structures.

The rebuild circuitry 188 can evaluate the impact on rebuilding times for a variety of different reactive actions, communications, and processing that can be undertaken by device-level, pods-level, and network-level components. Thus, the rebuild module 180 can predict, learn, and evaluate how diverse proactive and reactive operations would impact rebuild times based on current system conditions. FIGS. 7-10 respectively convey non-limiting embodiments of rebuild strategy implementations. It is noted that the respective implementations are not required and a rebuild strategy may involve the execution of multiple different proactive and/or reactive activities concurrently, sequentially, or independently.

Figure 7:
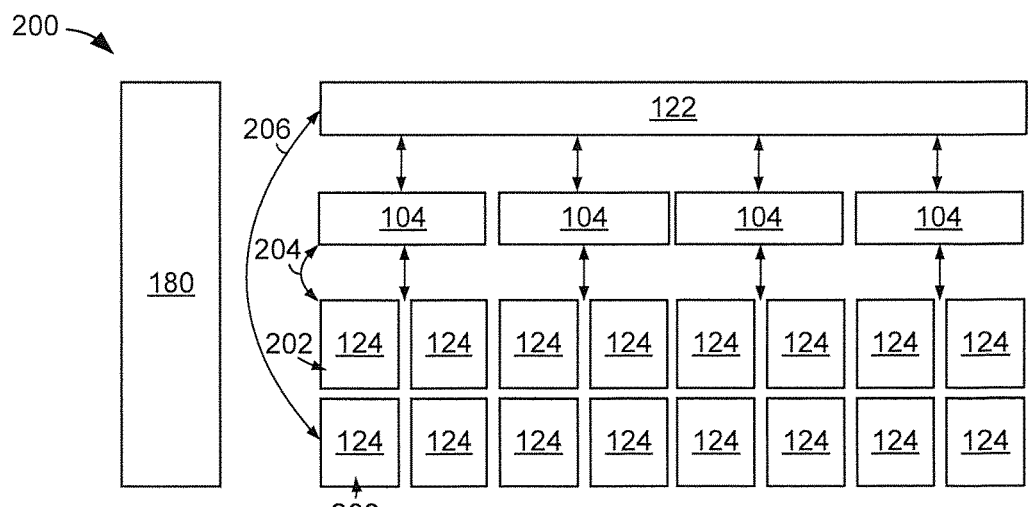
FIG. 7 illustrates a block representation of portions of an example data storage system utilized in accordance with some embodiments.

FIG. 7 depicts a block representation of portions of an example data storage system 200 utilized in accordance with some embodiments to implement a rebuild strategy generated from a rebuild module 180. In response to an error/failure 202 in a data storage device 102, the device-level controller 136 carries out a rebuild strategy by polling at least one downstream, pods-level and/or network-level controller 104/122 to determine which LBAs of the failure 202 contained valid data. For instance, the rebuild strategy can react to a detected failure 202 in some, or all, of the LBAs of a data storage device 102 by querying an upper level controller to ask which LBAs of the failed device 102 contained current, valid data, as represented by arrows 204 and 206.

It is contemplated that the polled upper level controller 104/122 returns more than just the location of valid data, such as the status of each of the LBAs of the failed portion of the data. For instance, a polled upper level controller 104/122 can return if LBAs are empty, non-current versions of data, error/failed, parity, mirror, or current versions of data. By utilizing upper level controller(s) 104/122 to determine which LBAs of a failed device 102 contain valid data instead of the local device controller allows the ensuing rebuild of the failed LBAs to efficiently reconstruct only the valid data. Such avoidance of rebuilding invalid data and error-prone LBAs eliminates unnecessary processing and reduces rebuilding time.

While it is possible that each data storage device 102 can maintain a table of the valid data, invalid data, and error-prone LBAs, the maintenance of such a table would drastically increase the processing operations undertaken by a local controller. In addition to the degraded performance associated with increased volumes of local controller processing, the storage and frequent updating of information identifying the status of each LBA in a data storage device 102 would quickly reach the finite threshold of data writes to solid-state memory. Hence, the maintenance of the status of LBAs by one or more upper level controllers 104/122 can more efficiently conduct processing and utilize various storage location for status tables than a local controller 124.

Figure 8:
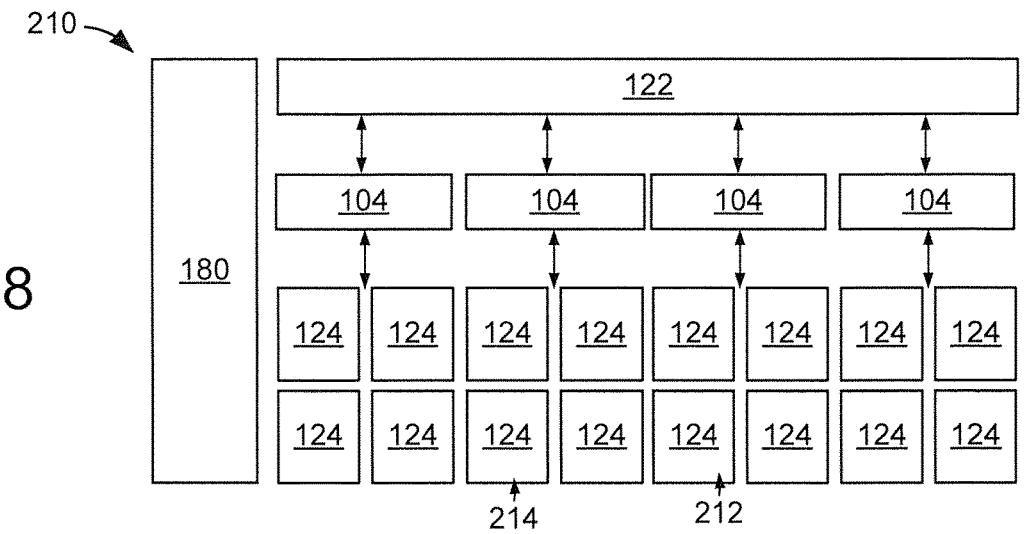
FIG. 8 displays a block representation of portions of an example data storage system arranged in accordance with various embodiments.

FIG. 8 displays a block representation of portions of an example data storage system 210 utilized in accordance with various embodiments to implement a rebuild strategy generated from a rebuild module 180. In response to a failure 212 of one or more data storage devices 102 that is estimated to take a relatively long time to rebuild, an upper level controller 104/122 (pods-level and/or network-level) can direct non-failed devices 214 to temporarily increase data durability of at least one data stripe. The increase of data durability may involve altering a data stripe to include one or more additional volumes of parity, such as writing more parity in a different device 102 and location.

Some embodiments increase the durability of data stripes in non-failed devices 214 to compensate for the data stripes of the failure 212. For example, failure of a data stripe having two volumes of parity data associated with eight volumes of user-generated data can prompt compensation by writing an additional volume of parity data to other non-failed data stripes. Such compensation may be particularly effective in a multi-level erasure system where data stripes have different numbers of parity volumes, such as if a first level stripe has ten data volumes and one parity volumes and a second level has eight data volumes and two parity volumes before a failure 212 to the second level that is compensated by increasing the parity volumes to three or more.

The ability to temporarily, or permanently, increase the durability of data in response to a failure 212, or proactively in anticipation of a failure predicted in the rebuild strategy, allows more parity data volumes, and locations, to be used for data stripe rebuilding operations. In a catastrophic failure of multiple data storage devices 102, the elevation of the number of parity data volumes can drastically reduce the time associated with rebuilding numerous data stripes over multiple data storage devices 102. It is contemplated that increased parity data volumes can temporarily be written anywhere in a distributed data storage system 210, such as other data storage devices, a non-failed portion of a data storage device incurring the failure 212, network cache, or remote buffer.

Figure 9:
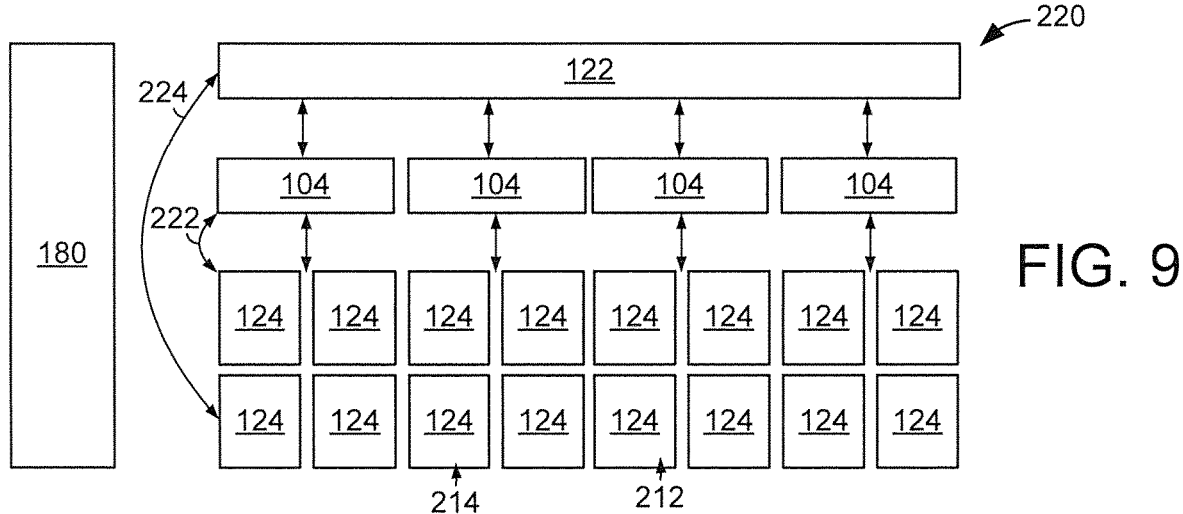
FIG. 9 shows a block representation of portions of an example data storage system arranged in accordance with various embodiments.

FIG. 9 depicts a block representation of portions of an example data storage system 220 utilized in accordance with assorted embodiments to implement a rebuild strategy generated from a rebuild module 180. The maintenance of volumes of parity data allow a data stripe to be rebuilt despite losing a number of data storage devices 102. A local device controller 124 may conduct one or more rebuilding operations to repair at least one data stripe from the volumes of parity data. However, such rebuilding operation can be processing intensive and relatively slow.

With the implementation of a rebuild strategy, a local controller 124 can employ one or more upper level controllers 104/122 to aid in the rebuilding of one or more data stripes, as represented by arrows 222 and 224. For instance, a local controller 124 can initially distribute half the overall data rebuild computations to one or more upper level controllers 104/122. In another example, a local controller 124 can conduct all rebuild computations and processing for a threshold amount of time designated by the rebuild strategy before passing some, or all, of the rebuild processing/computations to one or more upper controller 104/122. The ability to proactively and reactively employ other processing components of a distributed data storage system 220 allows a local controller 124 to receive assistance for rebuilding operations to improve rebuild times without degrading the performance of the processing components.

It is contemplated that the rebuild strategy, and local controller 124 executing the strategy, can prescribe the rebuilding of certain data, data stripes, or types of data to particular controllers 104/122. Such assignment of rebuilding to a particular controller 104/122 may coincide with a higher level of data security, data stripe configuration that would take longer to rebuild with the local controller 124, or the processing capabilities of the assigned controller versus the local controller. Some embodiments of an executed rebuild strategy employ multiple different controllers 124/104/122 concurrently in processing and computing data for to rebuild some, or all, of a data stripe.

Figure 10:
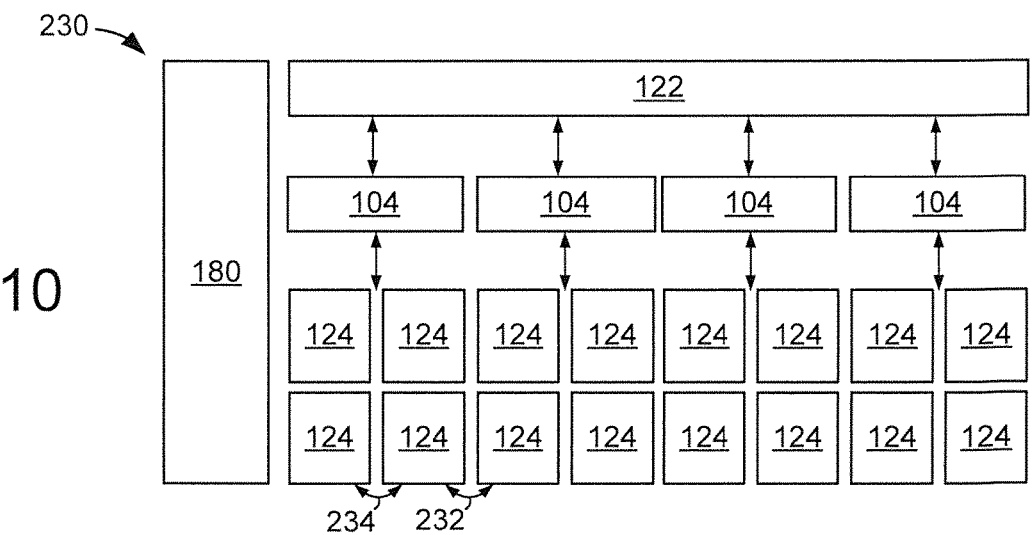
FIG. 10 depicts a block representation of portions of an example data storage system arranged in accordance with various embodiments.

The capability to employ controller(s) to aid in the rebuilding of failed data is not limited to upper level controllers 104/122. FIG. 10 depicts a block representation of portions of an example data storage system 230 configured in accordance with some embodiments to implement a rebuild strategy generated from a rebuild module 180. The system 230 employs one or more local controllers 124 of non-failed data storage devices 102 to aid in conducting rebuilding operations, as represented by arrows 232 and 234. The use of other local controllers 124, instead of upper level controllers 104/122 may improve erasure coding and rebuilding performance with hardware and reduced workload compared to upper controllers 104/122. For instance, local controllers 124 may have data rebuilding application specific integrated circuits that can provide efficient data rebuilding from one or more parity volumes.

Although not limiting or required, the use of other controllers 104/122/124 to carry out rebuilding operations can involve determining what data of the failed LBAs of one or more data storage devices 102. That is, instead of rebuilding every LBA of a failed device 102, one or more system controllers 104/122/124 can compute the contents of the failed LBAs and rebuild the data that actually was lost due to the failure. A determination of the contents of failed LBAs may further be used to prioritize, or schedule, the rebuilding of data, such as with heavily degraded data stripes, sensitive data, or only parity data portions of a data stripe being rebuilt first or last.

Figure 11:
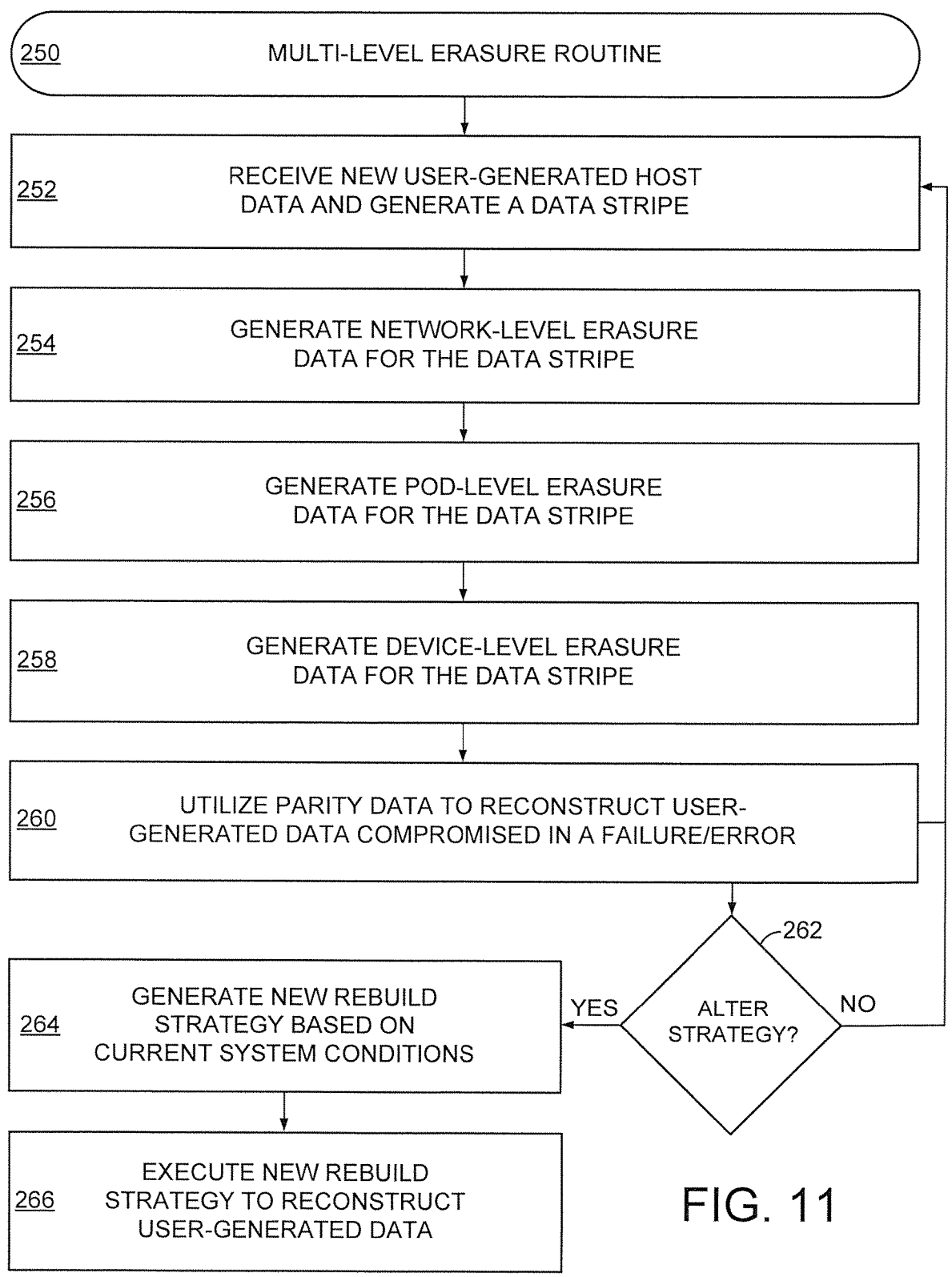
FIG. 11 is an example multi-level erasure routine that can be carried out with the respective embodiments of FIGS. 1-10.

FIG. 11 displays an example multi-level erasure routine 250 that can be carried out with the assorted embodiments of FIGS. 1-10. Initially, a distributed data storage system is setup and interconnected so that at least one remote host can direct data access operations to, and from, at least one data storage device. It is contemplated that multiple data storage devices are arranged to for data storage for host requests without the host knowing, or having the ability to control, what data storage device will service the request. A distributed data storage system may position one or more controllers in different hierarchical levels, such as network, pods, and device levels, connected to a rebuild module.

Receipt of new host data in step 252 prompts a data stripe to be computed and stored across numerous data storage devices of the system. In a single level erasure system, a single data stripe would be created across multiple separate data storage devices with a predetermined number of user data volumes and a predetermined number of corresponding parity data volumes. With a multi-level erasure system, multiple levels of at least data stripe parity volumes are created and stored in the respective system levels (network/pods/device). Hence, steps 254, 256, and 258 proceed to generate erasure data, which is at least parity volumes of host-provided, user-generated data, for the network-level controller, the pods-level controller, and the device-level controller.

The erasure data for the respective system levels can be configured in a hierarchical arrangement. For instance, the highest level may have a single parity volume while the pods-level has two parity volumes and the device-level has three parity volumes for each data stripe stored in the data storage devices of a pods. That is, device-level erasure data may be resident in a data storage device and pods-level erasure data may involve parity data for each data stripe stored in each of the data storage devices controlled by a pods-level controller, such as a rack or server controller positioned at the same physical location as the respective connected data storage devices.

The generation of different amounts of parity data in the assorted levels of a distributed data storage system allows for efficient hierarchical polling of parity data, which can alleviate workload and delays in local device, or pods, rebuilding of data after a failure/error has compromised one or more data stripes. While not required, step 260 can utilize the parity data from one or more levels to reconstruct some, or all, of the user-generated data compromised in an encountered failure/error. The routine 250 can cyclically conduct steps 252-260 to receive new data, generate parity data, and use that parity data to reconstruct compromised data in accordance with a rebuild strategy.

However, it is contemplated that a rebuild module can continuously, or sporadically, evaluate data storage conditions and performance in one or more data storage devices in decision 262 to determine if an alteration to an existing rebuild strategy can improve the risk of data storage device failure and/or reduce the time to complete data rebuilding after an encountered error/failure. A determination that a rebuild strategy alteration would be beneficial from decision 262 prompts step 264 to generate a new rebuild strategy that is then put into place by at least one level of the distributed data storage system in step 266.

In some embodiments, decision 262 can determine that one or more proactive actions can be executed to decrease the risk of a data storage device failure/error. For instance, a rebuild strategy can be altered to divide user-generated data into more, less, bigger, or smaller divisions across greater, or fewer, data storage devices to mitigate the chance that a device will encounter an error. It is contemplated that data stripes in an altered rebuild strategy may maintain a stripe configuration, but be moved to a different set of data storage devices to avoid an error-prone device. Such movement of data stripes may separate parity data from the corresponding user-generated data.

A rebuild strategy may alternatively be changed to alter the parity configurations of one or more levels (network/pods) to increase the durability of a data stripe. Thus, decision 262 can evaluate the current durability of stored data against failures/errors and modify current data stripe configurations and/or the rebuild strategy to mitigate the risk of permanent data loss and long rebuild times. It is noted that durability can be characterized as resiliency to an error/failure to a data storage device. Accordingly, data durability is increased with greater numbers of parity data volumes capable of being used to rebuild failed data. Durability may also be increased by moving parity data volumes to data storage locations that are less prone to errors and failures that would require the parity data to be rebuilt.

The ability to proactively alter data stripes and parity configurations on one or more levels of a system in response to current and/or predicted system conditions allows for accurate and efficient management of the system without degrading data storage performance. By generating the rebuild strategy that carries out proactive and/or reactive actions to detected system conditions, data rebuild times can be minimized and data storage failures can be avoided and/or mitigated.

Generally, when a lower level block erasure system loses a drive and the system is unaware of which lost blocks held valid data and which did not. If the system could know this, rebuild operations could be improved by only rebuilding blocks which held valid data as rebuilding blocks holding invalid data is unnecessary wasteful work. Therefore, various embodiments introduce an API by which the lower level block erasure system can query the upper level object erasure system to ask which blocks are valid.

It is contemplated that when the upper level erasure system needs to recover from the catastrophic failure of an entire lower level block erasure system, the system will need to transfer a large amount of data across the network, which is necessary but may be slow. If the operation is slow, this imperils data durability because additional failures may happen during the slow rebuild. Therefore, some embodiments introduce an API by which the upper level can ask other lower level erasure systems to temporarily increase their internal durabilities thereby more quickly restoring the desired level of durability. Once the upper level rebuild is complete, the system can signal the lower levels to remove the temporarily added extra durability. For example, assume we have 10+1 at the upper level and 8+2 at the lower level. If we lose an entire lower level system, our 10+1 at the upper level can restore the lost data but it will be slow. Therefore, it can temporarily ask the relevant lower level systems to temporarily increase to 8+3 to compensate for the lost durability at the external level.

When a lower level block erasure system irretrievably loses data (e.g. it was 8+2 and 3 drives failed at the same time), the system can ask the upper level to restore that lost data. By adding an API for this purpose by which the lower level can ask the upper level to calculate the data for particular blocks, operation can be optimized.

Embodiments can optimize erasure coding performance and cost within the lower level erasure block system. To further heighten performance and reduce cost, an API can be added such that the upper level object erasure system can ask a lower level block erasure system to compute erasure for it thereby allowing the optimized erasure unit to be used by all levels in the multilevel erasure system. Hence, multi-level erasures systems are built on top of block devices that just interact with those block devices via a very narrow and constrained block interface, which allows a richer interface than the standard block interface that can optimize operation of the multi-block erasure system.

What is claimed is:

1. A method comprising:
   connecting a host to a plurality of data storage devices via a network controller, each of the plurality of data storage devices and the network controller connected to a pods controller, each of the plurality of the data storage devices comprising a device controller;
   generating a rebuild strategy with a rebuild module connected to the plurality of data storage devices, the network controller, and the pods controller, the rebuild strategy directed to minimize data rebuild times in the event of a failure in the plurality of data storage devices;
   executing the rebuild strategy in response to a detected failure in at least one data storage device of the plurality of data storage devices;
   executing a first portion of the rebuild strategy by the device controller until a predetermined threshold of the rebuild strategy is met;
   executing a remaining portion of the rebuild strategy with the pods controller; and
   altering the rebuild strategy with the rebuild module in response to a detected change in data storage conditions.

2. The method of claim 1, wherein the rebuild module comprises a controller directing operations of a rebuild circuit.

3. The method of claim 1, wherein the rebuild module maintains a log of data storage operations to the plurality of data storage devices, the log employed to generate the rebuild strategy.

4. The method of claim 1, wherein the altered rebuild strategy increases a data durability of at least one data stripe stored in the plurality of data storage devices.

5. The method of claim 4, wherein the data durability is increased by writing at least one additional parity volume for a data stripe.

6. The method of claim 5, wherein the additional parity volume is stored in a data storage device of the plurality of data storage devices that does not contain a parity volume for the data stripe.

7. The method of claim 1, wherein the predetermined threshold of the rebuild strategy is an amount of time.

8. The method of claim 1, wherein the rebuild strategy is executed to reconstruct at least one user-generated data volume from a data stripe lost in the detected failure.

9. A method comprising:
   connecting a host to a plurality of data storage devices via a network controller, each of the plurality of data storage devices and the network controller connected to a pods controller, each of the plurality of the data storage devices comprising a device controller;
   generating a rebuild strategy with a rebuild module connected to the plurality of data storage devices, the network controller, and the pods controller, the rebuild strategy directed to minimize data rebuild times in the event of a failure in the plurality of data storage devices;
   executing the rebuild strategy in response to a first detected failure in at least one data storage device of the plurality of data storage devices; and
   altering the rebuild strategy with the rebuild module to change a data stripe by adding at least one parity volume in response to a predicted change in data storage conditions predicted by the rebuild module.

10. The method of claim 9, wherein the rebuild module comprises a prediction circuit that forecasts at least one change in data storage conditions based on detected current data storage conditions in the plurality of data storage devices.

11. The method of claim 10, wherein the altered rebuild strategy employs the pods controller with a controller to rebuild data lost by a second detected failure.

12. The method of claim 10, wherein the altered rebuild strategy employs the network controller and the pods controller to rebuild data lost by a second failure.

13. The method of claim 10, wherein the altered rebuild strategy employs multiple device controllers of separate data storage devices of the plurality of data storage devices to rebuild data lost by a second failure.

14. The method of claim 9, wherein the rebuild module comprises a learning circuit that correlates past logged data storage conditions with future data storage conditions in the plurality of data storage devices.

15. The method of claim 9, wherein the altered rebuild strategy changes a data stripe by adding at least two parity volumes volume in response to the predicted change in data storage conditions.

16. The method of claim 9, wherein the altered rebuild strategy temporarily increases a number of parity volumes stored at a network-level by the network controller in response to the predicted change in data storage conditions.

17. The method of claim 9, wherein the altered rebuild strategy temporarily increases a number of parity volumes stored at a pods-level by the pods controller in response to the predicted change in data storage conditions.

18. The method of claim 9, wherein the altered rebuild strategy temporarily increases a number of parity volumes stored at a device-level by the network controller in response to the predicted change in data storage conditions.

19. The method of claim 9, wherein the altered rebuild strategy adds at least one parity volume to a pods-level or a network-level to balance a loss of a parity volume at a device level in association with the first detected failure.

20. A method comprising:
   connecting a host to a plurality of data storage devices via a network controller, each of the plurality of data storage devices and the network controller connected to a pods controller, each of the plurality of the data storage devices comprising a device controller;
   generating a rebuild strategy with a rebuild module connected to the plurality of data storage devices, the network controller, and the pods controller, the rebuild strategy directed to minimize data rebuild times in the event of a failure in the plurality of data storage devices; and
   executing the rebuild strategy with the device controller and at least one of the pods controller and network controller in response to a detected failure in at least one data storage device of the plurality of data storage devices, the rebuild strategy executing a first portion with a device controller until a predetermined threshold of the rebuild strategy is met and subsequently executing a remaining portion of the rebuild strategy with the pods controller.

* * * * *